United States Patent [19]

Aibe et al.

[11] Patent Number: 5,403,548
[45] Date of Patent: Apr. 4, 1995

[54] ACTIVATED CARBON ADSORBENT AND APPLICATIONS THEREOF

[75] Inventors: Toshio Aibe, Tsukuba; Kazuo Shibata, Tohnosho, both of Japan

[73] Assignee: Takeda Chemical Industries Ltd., Osaka, Japan

[21] Appl. No.: 24,399

[22] Filed: Mar. 1, 1993

[30] Foreign Application Priority Data

Feb. 28, 1992 [JP] Japan .................. 4-078911
Apr. 22, 1992 [JP] Japan .................. 4-129998
Sep. 2, 1992 [JP] Japan .................. 4-260862

[51] Int. Cl.⁶ .............. A61L 9/00; E03D 9/052; B01J 20/04; C01B 31/08
[52] U.S. Cl. ............................ 422/5; 422/4; 422/122; 4/213; 502/426; 502/427; 423/244.03
[58] Field of Search .......... 4/347, 216, 217, 213; 502/425–427; 422/4, 5, 122, 124; 423/244.03

[56] References Cited

U.S. PATENT DOCUMENTS

| | | | |
|---|---|---|---|
| 4,317,242 | 3/1982 | Stamper | 4/217 X |
| 4,370,301 | 1/1983 | Doi et al. | 422/3 X |
| 5,043,310 | 8/1991 | Takeuchi et al. | 502/404 |
| 5,145,657 | 9/1992 | Kobayashi et al. | 423/219 |
| 5,288,306 | 2/1994 | Aibe et al. | 95/141 |

FOREIGN PATENT DOCUMENTS

| | | |
|---|---|---|
| 0331192 | 9/1989 | European Pat. Off. . |
| 0487263 | 5/1992 | European Pat. Off. . |
| 50-131847 | 10/1975 | Japan . |
| 52-63882 | 5/1977 | Japan . |
| 59-151963 | 8/1984 | Japan . |
| 59-199039 | 11/1984 | Japan . |
| 59-227704 | 12/1984 | Japan . |
| 61-68136 | 4/1986 | Japan . |
| 61-172561 | 8/1986 | Japan . |
| 62-262742 | 11/1987 | Japan . |
| 63-130138 | 6/1988 | Japan . |
| 0268929 | 10/1989 | Japan ............ 4/213 |
| 2088719 | 2/1981 | United Kingdom . |

OTHER PUBLICATIONS

Database WPIL, Week 9103, Derwent Publications Ltd., London, GB; AN 91-019882 & KR-A-9 001 367 (Gold Star).
Database WPIL, Week 9149, Derwent Publications Ltd., London, GB; AN 91-356988 & JP-A-3 238 011 (Kuraray Chem).
Database WPIL, Week 8206, Derwent Publications Ltd., London, GB; AN 82-11105E & JP-A-57 002 368 (Takeda).

*Primary Examiner*—Robert J. Warden
*Assistant Examiner*—E. Leigh Dawson
*Attorney, Agent, or Firm*—Foley & Lardner

[57] ABSTRACT

An alkali metal iodide and phosphoric acid are homogeneously supported on an activated carbon honeycomb, in respective amounts of 0.015 to 1.5 mg atoms as iodine and 1.4 to 7.0 mg equivalents per gram of activated carbon. The alkali metal iodide is potassium iodide. When both the chemicals are supported on activated carbon in amounts respectively within the above ranges, homogeneous supporting of phosphoric acid with the alkali metal iodide becomes possible without causing any decrease in adsorption and elimination capacities. A number of malodorous and harmful components such as nitrogen-containing compounds and sulfur-containing compounds can be efficiently removed with one kind of activated carbon over a long period of time. The activated carbon adsorbent thus obtained can be used for various deodorization purposes and in exhaust gas treatment, and is particularly suited for use in toilet deodorization and in gas treatment in closed spaces, for example in refrigerators.

23 Claims, 6 Drawing Sheets

ACTIVATED CARBON ADSORBENT AND APPLICATIONS THEREOF

FIELD OF THE INVENTION

The present invention relates to a novel activated carbon useful for removal of malodorous and/or harmful components from a gas and to applications thereof. More particularly, the invention relates to an activated carbon which can be used for the adsorption/elimination of malodorous and/or harmful components from gases in containers, cars, hospitals, homes for the aged, conference rooms, offices, homes, hotels, eating houses, karaoke rooms, animal quarters, pet shops, refrigerators, cool chambers, shoe boxes, closets, barns, dish closets, trash cans, rooms in which filthy materials are handled and toilets and from industrial waste gases, among others, and to a gas treating apparatus and a method of treating gases using said activated carbon. The activated carbon of the invention is particularly suited for use in a gas treating apparatus and a method of treating gases for the deodorization of toilets, refrigerators and the like.

BACKGROUND OF THE INVENTION

For the elimination of malodorous and/or harmful gaseous components, methods and apparatuses are known which comprise passing a gas containing malodorous and/or harmful components through a bed of granular or fibrous activated carbon. Such malodorous or harmful gases may contain sulfur-containing compounds such as hydrogen sulfide, mercaptans and sulfides, nitrogen-containing compounds such as ammonia and amines, aldehydes, carboxylic acids, hydrocarbons and the like.

These malodorous and harmful gaseous components are usually present in very low concentrations in the atmosphere but with the above-mentioned activated carbon alone, it is difficult to selectively adsorb and remove all of these malodorous and harmful components. The rate and amount of elimination are also very meager. Therefore, a large quantity of activated carbon is required for the adsorption/removal of malodorous and harmful components. Furthermore, since the activated carbon bed presents a large flow resistance, it cannot smoothly remove the malodorous and harmful components, with the result that a fan is essentially required but this results in an increased electric utility cost. Replacement of deactivated carbon with a fresh supply is also complicated.

For the adsorption/elimination of a plurality of malodorous and harmful components, chemical-supporting activated carbon species have been proposed. Thus, Japanese Patent laid open No. 151963/1984 discloses, as an acid-supporting activated carbon species, citric acid- or alkali metal citrate-supporting activated carbon. Japanese Patent laid open No. 227704/1984 proposes activated carbon supporting 1 to 20% by weight of a phosphoric acid compound. Furthermore, Japanese Patent laid open No. 172561/1986 discloses a deodorizer in the form of a honeycomb molding or the like which comprises 50 to 93% by weight of activated carbon, 5 to 30% by weight of a solid acid and 2 to 20% by weight of an organic binder.

However, such acid-supporting activated carbon species are low in adsorptivity for sulfur-containing compounds such as hydrogen sulfide and mercaptans.

Japanese Patent laid open No. 262742/1987 proposes a chemical-supporting activated carbon honeycomb supporting an acid, an alkali or a weakly acidic chemical such as an iron halide. Japanese Patent laid open No. 63882/1977 describes activated carbon supporting 0.1 to 2% by weight of an acid or alkali. Such honeycomb, when it is supporting an acid chemical such as sulfuric acid, can remove ammonia, while it is able to remove hydrogen sulfide and the like when an alkaline chemical is supported.

However, when an acid or weakly acidic chemical and an alkali are simultaneously supported on activated carbon, a salt is formed and therefore the acid and alkali fail to perform their respective functions, with the result that the adsorptivities for both nitrogen-containing compounds and sulfur-containing compounds are markedly reduced. For this reason, acid-supporting activated carbon and alkali-supporting activated carbon should be used separately. Furthermore, supporting of an alkaline chemical to eliminate sulfur-containing compounds such as hydrogen sulfide results in a lowered flash point, thus causing troubles in practical use. On the other hand, the addition of a flame retardant leads to a decrease in the amount of adsorption per unit specific surface area and, hence, a decrease in adsorption efficiency.

Iodine- or iodine compound-supporting activated carbon is also known in the art. Thus, British Patent No. 1090306, for instance, describes iodine- or ammonium iodide-supporting activated carbon and Japanese Patent Publication No. 9377/1987 discloses a deodorizer comprising an oxide and/or oxo acid of iodine supported on activated carbon. However, when iodine or such an iodine compound is used singly, the ability to remove ammonia and amines is insufficient and, hence, ordinary gases containing a plurality of malodorous components cannot be deodorized.

Thus, with such chemical-supporting activated carbon species and honeycombs made therefrom, harmful components which can be adsorbed and removed are limited by the type of chemical supported. Therefore, it is difficult to adsorb and remove a variety of malodorous and harmful components simultaneously with sufficient efficiency with one single activated carbon species over a long period of time.

Activated carbon supporting iodine or an iodine compound together with phosphoric acid is also known in the art. Thus, Japanese Patent laid open No. 131847/1975 (Japanese Patent Publication No. 2368/1982) proposes activated carbon supporting iodine or an iodine compound together with boric acid or phosphoric acid, both supported thereon. This activated carbon supports 0.2 to 4 g of phosphoric acid on 100 g of activated carbon (corresponding to 0.06 to 1.22 mg equivalents of phosphoric acid/g of activated carbon).

However, the intended purposes of said activated carbon are to remove sulfur compounds such as hydrogen sulfide and methylmercaptan, to regenerate iodine- or iodine compound-supporting activated carbon and to prevent the iodine or iodine compound from dropping off in the treatment for regeneration. Simultaneous elimination of a plurality of malodorous components is not intended at all. In fact, when the above-mentioned specific amount of phosphoric acid is supported simultaneously, the adsorptivity of the iodine or iodine compound decreases markedly in a short period of time. In addition, in spite of the supporting of phosphoric acid, it is impossible to adsorb and remove nitrogen-containing compounds such as ammonia and amines for a long period of time. It is a common knowledge in the art that supporting of phosphoric acid results in decreased adsorptivity of iodine or iodine compounds. For that reason, studies so far made regarding the amount of phosphoric acid to be supported are limited to an amount thereof just required to prevent the iodine or iodine compound from dropping off and enable activated carbon regeneration. No consideration has been given as yet to larger amount of phosphoric acid.

Japanese Patent laid open No. 68136/1986 discloses an adsorbent comprising activated carbon with sulfuric acid and an oxo acid of iodine both supported thereon, which is the only example so far disclosed of activated carbon for adsorption and elimination of ammonia and the like as well as sulfur compounds.

However, this adsorbent had a very low ignition point resulting from the supporting of sulfuric acid. In addition, this activated carbon adsorbent allows the oxo acid of iodine to be lost therefrom in the form of hydrogen iodide and, as a result, its adsorptivity decreases even in an early stage of use. Furthermore, drying of the adsorbent may cause odor development, an irritating odor may emanate during use and, further, the container containing the adsorbent may be corroded. Therefore, it is very difficult to apply such adsorbent to an ordinary inhabited area.

The adsorbent mentioned above, where an oxo acid of iodine (an iodine compound) and sulfuric acid (a member of the class of inorganic acids to which phosphoric acid also belongs) are supported, might be expected to be high in the ability to adsorb and eliminate sulfur-containing compounds such as hydrogen sulfide and methylmercaptan, like the earlier mentioned activated carbon supporting an iodine compound and phosphoric acid. Contrary to this expectation, the adsorptivity of this adsorbent for sulfur-containing compounds is low and moreover shows a marked decrease in a short period of time.

Thus, when two chemicals differing in kind are supported on activated carbon, one chemical lowers the eliminating ability of the other. Therefore, it is generally difficult to adsorb and remove a variety of malodorous and harmful components over a long period of time by supporting chemicals differing in kind combinedly on activated carbon.

SUMMARY OF THE INVENTION

Accordingly, it is an object of the invention to provide an activated carbon adsorbent with which a number of malodorous and harmful components occurring in a gas to be treated can be efficiently removed from said gas over a long period of time.

Another object of the invention is to provide an activated carbon adsorbent with which a number of malodorous and harmful components occurring in a gas to be treated can be removed from said gas smoothly and efficiently over a long period of time with low flow resistance and ready exchangeability.

A further object of the invention is to provide an apparatus and a method for treating gases in which an activated carbon adsorbent having such excellent characteristics as mentioned above is used.

A still further object of the invention is to provide an apparatus and a method for treating gases with good efficiency over a long period of time even in a closed space for which an electric power source is not readily available.

The intensive research and exploration made by the present inventors to accomplish the above objects have led them to the following findings: in activated carbon supporting an iodine compound and an inorganic acid, (1) phosphoric acid, among a large number of inorganic acids, is a very excellent component to be combined with the iodine compound, (2) when a specific amount of an alkali metal iodide and a specific amount of phosphoric acid are homogeneously supported on activated carbon, a remarkable effect can be produced, namely the ability to adsorb and remove a plurality of malodorous and harmful components can remain at a high level over a long period of time, while the ability to adsorb and remove a plurality of such components is small when said iodide and phosphoric acid are supported merely in combination disregarding such respective specific amounts, (3) said iodide and phosphoric acid can be supported homogeneously even on activated carbon in a honeycomb form and (4) honeycomb-shaped activated carbon, in particular, can be handled more easily than granular carbon and can be applied to an ordinary inhabited area (daily necessaries).

The present invention thus provides an activated carbon adsorbent homogeneously supporting both 0.015 to 1.5 mg atoms of atomic iodine, per gram of the activated carbon, of an alkali metal iodide and 1.4 to 7.0 mg equivalents, per gram of the activated carbon, of phosphoric acid. The above activated carbon may be in the form of an honeycomb.

The invention further provides a gas treating apparatus which comprises said activated carbon adsorbent as disposed in a gas passageway extending from a gas inlet means to a gas outlet means and a fan means for passing the gas to be treated through said passageway from said gas inlet means to said gas outlet means.

In said apparatus, the activated carbon adsorbent may be disposed in the gas passageway in combination with an activated carbon such as a non-chemical-supporting activated carbon. Said activated carbon adsorbent may be disposed on the gas inlet side and the fan means on the gas outlet side.

The apparatus mentioned above is useful for deodorization treatment of a toilet. When a dry cell or cells are used as a power source for the driving means for driving the fan means, said apparatus can treat the gas within a closed space for which a power source is not readily available.

The invention also provides a method of treating gases which comprises bringing a gas to be treated into contact with the activated carbon adsorbent mentioned above. This method is useful in deodorizing a gas containing at least one component selected from among sulfur-containing compounds, nitrogen-containing compounds, organic carboxylic acids and the like and in treating a gas in a closed space. Where a gas further contains aromatic hydrocarbons, aldehydes and the like, the treatment may be carried out by use of said activated carbon adsorbent in combination with an activated carbon such as a non-chemical-supporting activated cabon. The non-chemical-supporting activated carbon may be disposed upstream of the activated carbon adsorbent.

It is only required that the alkali metal iodide and phosphoric acid are homogeneously supported on activated carbon in a manner depending on the shape or form of the activated carbon and in a coexisting manner so that they can function cooperatively. Thus, even when the activated carbon is in the form of a mass of powder particles or granules, the alkali metal iodide and phosphoric acid are homogeneously supported together on the particles or granules. When the activated carbon is in the form of a molding, for example a honeycomb structure, it is also only required that the alkali metal iodide and phosphoric acid are homogeneously supported on the molding.

Further, the activated carbon adsorbent can support other effective elements on itself. Examples of such elements include platinum, bromine, etc. And also, the adsorbent can be used in combination with an other conventional adsorbent or the like.

In the present specification, the term "phosphoric acid" is used to include, within the meaning thereof, not only orthophosphoric acid but also condensed phosphoric acid, metaphosphoric acid, pyrophosphoric acid and the like.

Figure 1:
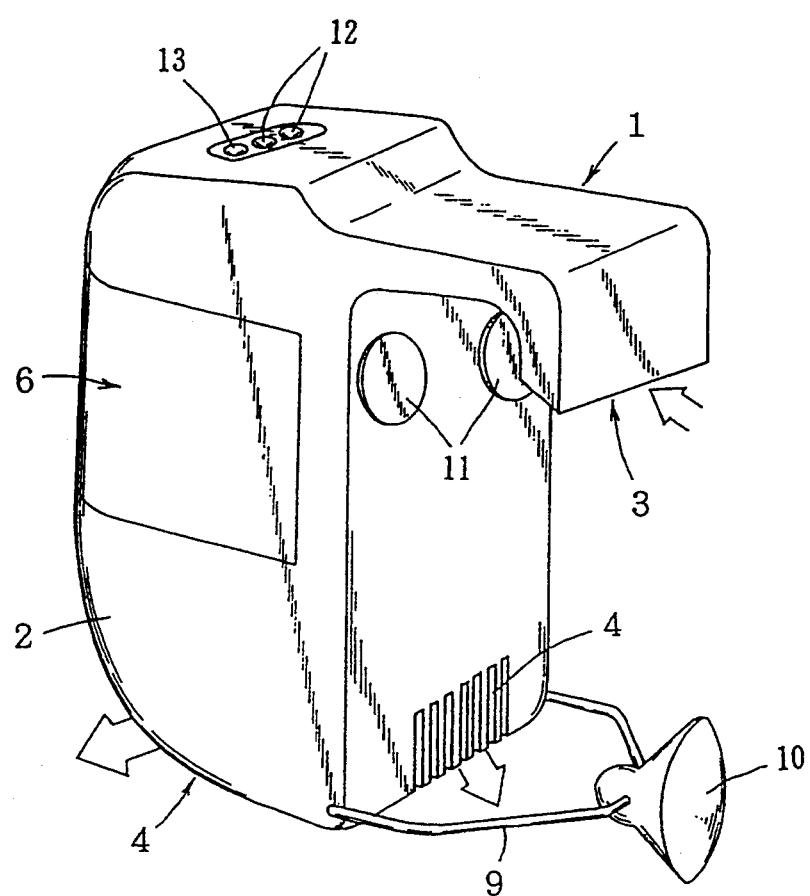
FIG. 1 is a schematic perspective view showing a gas treating apparatus provided with an activated carbon of the invention.

These objects and advantages of the present invention will be better understood from the following detailed description, accompanying drawings, examples, comparative examples and test examples.

DETAILED DESCRIPTION OF THE INVENTION

The activated carbon on which the alkali metal iodide and phosphoric acid are to be supported is not limited to any particular species but may include activated carbon species obtained by conventional methods using, as starting materials, charcoal, coke, coconut shells, natural fibers, synthetic resins such as polyacrylonitrile, rayon and phenol resin, pitch, and the like. The activated carbon may have any form, for example powdery, granular, pellet structure, macaroni structure, fibrous or honeycomb structure. Among such forms, the pellet, fibrous and honeycomb structures are preferred. Activated carbon honeycombs are particularly preferred because of a low flow resistance and great surface area for contacting with gases to be treated.

The activated carbon may contain one or more of various binders, for example clay minerals. The activated carbon content should be not less than about 30% by weight.

The BET (Brunauer-Emmett-Teller equation) specific surface area of the activated carbon is generally 200 to 4,000 $m^2/g$, preferably 400 to 3,500 $m^2/g$ and more desirably 500 to 3,000 $m^2/g$. Where the activated carbon is formed in a honeycomb structure, the BET specific surface area of the activated carbon is generally 300 to 3,000 $m^2/g$, and preferably 400 to 2,500 $m^2/g$. The activated carbon having such a specific surface area exhibits an enhanced adsorbent capacity.

When the activated carbon is formed in a honeycomb structure, the number of cells in the activated carbon honeycomb is about 10 to 1,500 cells/square inch, preferably about 20 to 1,000 cells/square inch and more preferably about 25 to 750 cells/square inch. Such a number of cells in the honeycomb provides a low flow resistance without lowering the adsorption capacity. The activated carbon honeycomb can be used singly, as one layer, or in combination with a plurality of the honeycombs, as plural layers. A plurality of the honeycombs may be arranged in the longitudinal and/or cross direction, if necessary with some in the thickness direction. The thickness of the activated carbon honeycomb can be selected within the range which insures a sufficient deodorizing efficiency, this being not less than about 5 mm per layer, preferably not less than 7.5 mm per layer (e.g. about 7.5 to 200 mm) and more preferably not less than 10 mm (e.g. about 10 to 30 mm) per layer.

When the adsorbent is applied to a small apparatus, especially to an apparatus having a portable battery, the effective sectional area for passage of the activated carbon honeycomb is usually in the range of about 2 to 200 $cm^2$ per layer, preferably about 5 to 150 $cm^2$ per layer and more preferably about 10 to 100 $cm^2$ per layer. Furthermore, the aperture ratio of the activated carbon honeycomb is usually in the range from about 50 to 80% and preferably about 55 to 75%.

The alkali metal iodide and phosphoric acid are supported on such activated carbon to form an adsorbent. The activated carbon adsorbent of the invention is characterized in that in spite of homogeneous supporting of said iodide and phosphoric acid, its ability to adsorb and remove a plurality of malodorous and/or harmful components will not show any substantial decrease for a long period of time. In accordance with the invention, the alkali metal iodide and phosphoric acid are not merely combined for their being supported on activated carbon but are caused to be supported on activated carbon in the respective specific proportions. It is particularly important that phosphoric acid be supported within the specific proportion range.

The alkali metal iodide includes, for example, LiI, NaI, KI, $KI_3$, RbI and CsI. Potassium iodide is one of the most preferred. Such alkali metal iodides can be used alone or in combination.

The amount of the alkali metal iodide to be supported on each gram of activated carbon is 0.015 to 1.5 mg atoms of atomic iodine, preferably 0.02 to 1.25 mg atoms iodine, and more preferably about 0.04 to 1.1 mg atoms of atomic. When the amount of the alkali metal iodide supported is outside the above range, the adsorption/elimination effect decreases in an early stage.

As typical examples of the phosphoric acid, there may be mentioned orthophosphoric acid, metaphosphoric acid and polyphosphoric acid (acylic polyphosphoric acids such as pyrophosphoric acid, cyclic polyphosphoric acids such as trimetaphosphoric acid, tetrametaphosphoric acid, and linear polymetaphosphoric acids). Among the preferred phosphoric acids is orthophosphoric acid. These phosphoric acids can be used alone or in combination.

The amount of phosphoric acid to be supported on each gram of activated carbon is 1.4 to 7.0 mg equivalents, preferably 2.0 to 7.0 mg equivalents, and more preferably about 2.5 to 6.5 mg equivalents. When the amount of phosphoric acid is outside the above range, the adsorption/elimination effect cannot be maintained for a long period of time. When the amount of phosphoric acid supported is within the above range, it is possible to add the alkali metal iodide simultaneously for its being supported.

When the above-mentioned specific proportions of the alkali metal iodide and phosphoric acid are homogeneously supported on activated carbon, the resulting activated carbon adsorbent unexpectedly shows a high level of ability to adsorb and eliminate a plurality of malodorous and/or harmful components such as nitrogen-containing compounds and sulfur-containing compounds and, at the same time, this ability can be maintained for a long period of time. Furthermore, the adsorbent will not develop any irritating odor during drying or use. The ignition point of the activated carbon will not lower, either. Therefore, the activated carbon adsorbent of the invention can be safely applied to daily necessaries.

Generally, it might be anticipated that the adsorbing and eliminating capability for sulfur-containing compounds such as hydrogen sulfide and mercaptans increase with the increase in the amount of the alkali metal iodide supported on activated carbon and that the adsorptivity for nitrogen-containing compounds such as ammonia and amines increase with the increase in the amount of phosphoric acid or the like acid supported on activated carbon. Unexpectedly, however, when the alkali metal iodide is supported on activated carbon in combination with phosphoric acid, the adsorbing and eliminating capability decrease even in an early stage of use if the amounts of both the chemicals mentioned above deviate from the above-specified respective ranges.

Supporting of the above-mentioned iodide and phosphoric acid on the activated carbon can be effected according to the conventional procedure. For example, an alkali metal iodide is firstly supported on an activated carbon by treating the activated carbon with the iodide, in the form of an aqueous or organic solution or dispersion, by spraying, impregnation or dipping. The resulting iodide-supporting activated carbon may be, if necessary, dried or sintered, and then phosphoric acid, either as it is or in the form of an aqueous solution or dispersion, is supported on the obtained activated carbon, by spraying, impregnation or dipping, and, if necessary, the resultant activated carbon may be dried or sintered. Alternatively, after supporting phosphoric acid, the alkali metal iodide may be supported on the activated carbon in the same manner as above-mentioned. Furthermore, both the alkali metal iodide and phosphoric acid may be supported on the activated carbon by treating the activated carbon with an aqueous or organic solution or dispersion of the iodide and phosphoric acid, and, in necessary, the resulting activated carbon may be dried or sintered.

It should be understood that iodine may be incorporated with the alkali metal iodide. In this case, iodine together with the alkali metal iodide may be supported on the activated carbon by treating the activated carbon with a solution containing iodine and the iodide, by spraying, impregnation or dipping. The total amount of the alkali metal iodide and iodine is, in terms of iodine, in the range mentioned hereinbefore.

The alkali metal iodide and phosphoric acid can be supported on the activated carbon by mixing the iodide and phosphoric acid, in the form of a solution or powder, with the starting activated carbon for subsequent molding. This procedure is suitable for preparing a molded activated carbon such as the granular, pellet, macaroni forms, particularly honeycomb form.

Even when used singly, the activated carbon adsorbent of the invention shows a high-level deodorizing and adsorbing capacity against various malodorous and harmful components such as sulfur-containing compounds, nitrogen-containing compounds, organic carboxylic acid, aldehydes and aromatic hydrocarbons. In particular, it can remain effective, over a long period of time, in eliminating a number of malodorous and/or harmful components including sulfur-containing compounds such as hydrogen sulfide, methylmercaptan and other mercaptans and sulfides, nitrogen-containing compounds such as ammonia, monomethylamine, dimethylamine, trimethylamine and other amines, and organic carboxylic acids such as formic acid, acetic acid, propionic acid, butyric acid and valeric acid. Therefore, the adsorption and elimination purposes can be efficiently achieved by the single use of the activated carbon adsorbent and thus the amount of activated carbon can be reduced to about one third to one tenth as compared with the conventional activated carbon products. Particularly when the activated carbon adsorbent has a honeycomb structure, the adsorption and elimination can be effected smoothly with low flow resistance and the deodorizer or the like can be compacted and can be produced at a reduced cost.

In some case, the gas to be treated contains aromatic hydrocarbons such as benzene, toluene, xylene, styrene, naphthalene, phenol and xylole, organic carboxylic acid such as formic acid, acetic acid, propionic acid, butyric acid and valeric acid, and aldehydes such as formalin and acetaldehyde. When the gas contains these components in a higher concentration, the adsorption/elimination is preferably conducted by use of the activated carbon adsorbent of the present invention in combination with a non-chemical-supporting activated carbon. The preferred non-chemical-supporting activated carbon has a honeycomb structure and is disposed in the passageway upstream from the activated carbon adsorbent to enhance the deodorizing effect.

According to the method of the present invention, a gas to be treated is brought into contact with the above-mentioned activated carbon adsorbent. The gas to be treated may be any of various malodorous and harmful component-containing gases. Such gases contain, as the malodorous or harmful component, at least one member selected from among those sulfur-containing compounds, nitrogen-containing compounds, aldehydes, hydrocarbons and carboxylic acids specifically mentioned hereinabove.

In a preferred embodiment of the gas treating method, a gas containing at least one sulfur-containing compound and one nitrogen-containing compound is brought into contact with the activated carbon adsorbent.

The temperature of the gas to be treated is allowed to vary only if the efficiency of adsorption by the activated carbon adsorbent will not be adversely affected. Thus, it may range from about −50° C. to 100° C., preferably about −30° C. to 80° C., and more preferably about −20° C. to 65° C.

In contacting the material gas containing malodorous and/or harmful components with said adsorbent, the linear velocity of the material gas may for example be about 1 to 200 cm/sec., preferably about 2 to 150 cm/sec., and more preferably about 5 to 100 cm/sec. The space velocity of the gas may for example be about 20 to 500,000 $hr^{-1}$, preferably about 50 to 250,000 $hr^{-1}$ and more preferably 100 to 150,000 $hr^{-1}$.

The activated carbon adsorbent of the present invention can be used in various fields of application where elimination of malodorous and/or harmful components is required. Thus, for instance, it can be used in gas treatment apparatus for deodorization or discharge gas treatment apparatus in chemical plants or the like, wall-type, stationary-type (self-standing type) or other type gas treatment apparatus for deodorization to be used in rooms, gas treatment apparatus for toilet deodorization, and deodorizers or gas treatment apparatus for deodorization to be used in spaces for which an electric power source is not readily available, for example in refrigerators, shoe boxes, dish closets, etc.

A gas treating apparatus of the present invention comprises an activated carbon adsorbent, preferably an activated carbon honeycomb adsorbent, supporting an alkali metal iodide and phosphoric acid disposed in a gas passageway extending from a gas inlet means to a gas outlet means, and a fan means for passing a gas to be treated through the gas passageway from the gas inlet means to the gas outlet means.

The activated carbon adsorbent and the fan means may be disposed in an appropriate position of the gas passageway. For example, the activated carbon adsorbent may be disposed in the gas passageway upstream from the fan means, i.e. closer to the gas inlet side. When the activated carbon adsorbents are disposed in different sites of the gas passageway, the fan means may be installed between the plurality of the adsorbents in the gas passageway.

To draw the gas positively by a suction force applied by the fan means and to prevent corrosion of the fan means, the activated carbon adsorbent is preferably disposed in the gas inlet side of the gas passageway and the fan means is preferably disposed in the gas outlet side of the gas passageway. The activated carbon adsorbent and the fan may be disposed close together or separated from each other. The preferred apparatus is provided with a fan means disposed on the downstream side of the activated carbon adsorbent, i.e. closer to the gas outlet side.

The fan means is preferably provided with a rotatable fan which can be driven by a driving means such as a motor.

A dust filter or a static charge filter may be disposed in an appropriate position of the gas passageway, preferably upstream from the activated carbon ad sorbent. Furthermore, in some cases, an opening/closing means such as a damper may be disposed on the gas inlet and/or gas outlet side so as to open or close the gas passageway in response to the action of the fan means.

For toilet deodorization, a gas treating apparatus may be used which comprises a gas inlet to be disposed within a toilet bowl and a gas outlet to be disposed outside the toilet bowl, and in which a deodorizing treatment can be conducted by aspirating gas from within the toilet bowl into the gas inlet and by bringing the gas into contact with the activated carbon adsorbent. Furthermore, in toilet deodorization, it is useful to employ a gas treating apparatus which can deodorize malodorous components remaining within the toilet bowl during the user sitting on a stool seat as well as after leaving the stool seat. Such gas treating apparatus is preferably provided with a sensor for detecting the user's sitting on the stool seat and leaving from the seat, a driving means operative in response to a sitting detection signal from the sensor to drive the fan means disposed in the gas passageway, and a control means which controls the duration of operation of the driving means in response to a leaving detection signal from the sensor.

Figure 2:
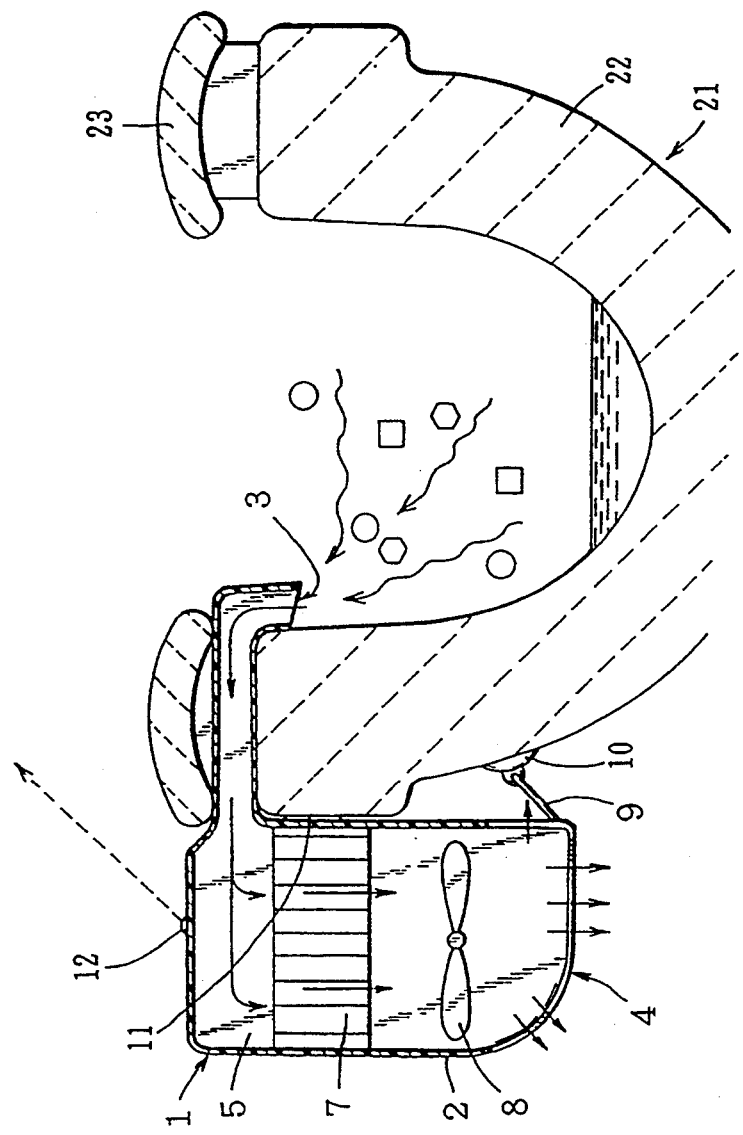
FIG. 2 is a schematic sectional view showing a toilet bowl provided with the gas treating apparatus shown in FIG. 1.

FIG. 1 is a schematic perspective view showing a gas treating apparatus provided with an activated carbon adsorbent of the invention, and FIG. 2 is a schematic sectional view showing a toilet bowl provided with the gas treating apparatus shown in FIG. 1.

The deodorizing apparatus 1 comprises a casing 2 having a suction port 3 and an exhaust port 4 and a snap-on cartridge 6 snugly accommodatable in a gas duct 5 extending from the suction port 3 to the exhaust port 4. The cartridge 6 houses an activated carbon honeycomb 7 supporting an alkali metal iodide and phosphoric acid. Disposed downstream of the gas duct 5 is a fan 8 which is driven by a motor (not shown).

A toilet 21 comprises a toilet bowl 22, a stool seat 23 provided with projections which are adapted to contact the top circumferential edge of the toilet bowl, and a cover (not shown) covering the open side of the toilet bowl 22. The stool seat 23 is attached swingably with respect to the toilet bowl 22.

The portion of the casing 2 which is extending from the suction port 3 to the cartridge 6 is curved in the sectional shape of the letter U and this curved portion can rest on the top circumferential edge of the bowl 22. Thus, the suction port 3 can be disposed within the toilet bowl 22, and the exhaust port 4 can be disposed outside the bowl 22.

Moreover, the lower side wall of the casing 2 is provided with a mounting means by which the casing 2 may be mounted and dismounted with respect to the toilet bowl 22. In this embodiment, the mounting means comprises a flexible supporting member 9 which is secured to the lower side wall of the casing 2, and a suction pad 10 which is secured to the supporting member 9 and can be attached to the side wall of the toilet bowl 22. The supporting member 9 may be a freely rotatable member.

Further, a spacer 11 made of a shock absorbing material such as sponge or plastic foam is attached to the upper inner side wall of the curved portion of the casing 2. This spacer 11 is abutted against the upper lateral wall of the bowl 22. Therefore, in setting the curved portion of the casing 2 on the peripheral part of the toilet bowl 22, the elasticity of the spacer 11 makes it possible to mount the deodorizing apparatus 1 easily in intimate contact with the bowl 22 and, by means of the mounting means, the deodorizing apparatus 1 so mounted can be easily secured in position. Furthermore, also due to the elasticity of the spacer 11, the deodorizing apparatus can be easily mounted in any position of the toilet bowl 22 even when the edge of the bowl 22 varies somewhat in width.

Disposed at the top of the casing 2 is a photosensor 12 for detecting the user's sitting on the stool seat 23 and his leaving from the stool seat 23 and a warning lamp 13 as a means for alerting the user to the event that the useful life of the activated carbon honeycomb 7 has run out. Since the sensing direction of the photosensor 12 is obliquely upwards from the exterior to the interior of the toilet 21, the user's sitting on the stool seat 23 and leaving from the seat 23 can be positively detected, irrespective of whether the deodorizing apparatus 1 is installed on the right side of the bowl 22 or on the left side.

With this deodorizing apparatus 1, the malodorous component, such as urine odor, within the toilet 21 is aspirated by the fan 8 associated with the motor from the suction port 3, brought into contact with the activated carbon honeycomb 7, and finally exhausted from the exhaust port 4. In this arrangement, since the activated carbon adsorbent is in the form of a honeycomb, not only is the flow resistance low but the flow of gas is made to be uniform so that the activated carbon honeycomb 7 is efficiently supplied with the gas to be treated.

As a result, the malodorous components are thoroughly eliminated by the single activated carbon honeycomb 7 supporting the alkali metal iodide and phosphoric acid. The corrosion of the motor and the fan 8 disposed in the gas passageway 5 downstream from the activated carbon honeycomb 7 can be prevented and, hence, a high deodorizing efficiency can be maintained over a long term. Moreover, since a suction force is applied by the fan 8 which is disposed closer to the exhaust port of the casing 2, the malodorous components can be drawn positively even in the presence of assembling clearances with respect to the casing 2 and the honeycomb 7, cracks or pinholes of the casing 2 or other parts with the result that malodorous components do not escape from the apparatus. In addition, mounting and dismounting of the cartridge 6 is easy, so the honeycomb 7 can also be easily replaced with a fresh one.

Furthermore, the sitting detection signal from the sensor 12 is fed to a driving circuit of the motor, and the fan 8 is rotated in association with the operation of the motor. In addition, the leaving detection signal from the sensor 12 is applied to a built-in timer (not shown) on the casing 2 to control the operation time of the motor. Therefore, malodorous components remaining within the toilet 21 can be removed not only during but also after defecation or urination.

In the practice of the present invention, the type of sensor is not critical if it is capable of sensing defecation, urination, sitting on the stool seat or leaving the seat, and may for example be a photosensor, a pressure switch, a pressure sensor, an odor sensor, a temperature sensor, an ultrasonic sensor or the like. The preferred sensor includes a photosensor such as an infrared beam sensor. A particularly preferred sensor, for detecting the user's sitting on the stool seat and leaving the seat, is a photosensor which the sensing direction is set obliquely upwards from the exterior to the interior of the toilet.

The control means for controlling the operation time of the fan means is preferably a timer means for actuating the driving means for at least 10 seconds in response to a leaving detection signal from the sensing means.

The preferred control means is provided with a timer means for actuating the driving means for a predetermined time, and a set/reset means for resetting the timer means in response to a sitting detection signal from the sensing means and setting the timer means in response to a leaving detection signal. The set/reset means may comprises a flip-flop in which the sitting detection signal and leaving detection signal from the sensing means are fed to an S-terminal and, through an inverter, an R-terminal.

In this apparatus, the fan may be driven in accordance with the user's sitting on the stool seat, and the timer means is reset in response to a reset signal from a Q-terminal of the flip-flop. Moreover, in accordance with the user's leaving the seat, the timer means starts counting to drive the fan means for a preset time, after defecation or urination, in response to a start signal from a $\overline{Q}$-terminal of the flip-flop so as to efficiently remove the residual malodor.

The gas treatment apparatus for deodorization or discharge gas treatment apparatus may be provided with an alerting means for alerting the user to the event that the useful life of the activated carbon adsorbent has run out and the time of replacement of the adsorbent has reached. The apparatus may be provided with a counting means (e.g. an RPM detector for detecting rpm of a motor) for measuring a cumulative operation time, a comparator means for comparing the count value of the counting means with a reference value corresponding to a useful life of the activated carbon adsorbent, and an alerting means (e.g. a lamp or a buzzer) for informing the end of the useful life of the activated carbon adsorbent when the count value is larger than the reference value.

The gas treatment apparatus for deodorization may be provided with a sensor means for sensing a bad odor, and a driving means such as a motor for driving a fan disposed in the gas passageway in response to a detection signal from the sensor. Further, the apparatus may includes a sensor means for detecting a bad odor, a comparator means for comparing the detection value of the sensor means with a reference value associated with an organoleptically detectable concentration of malodorous components, and a driving means for driving a fan disposed in the gas passageway when the detection value is larger than the reference value.

Furthermore, the suction port 3 may be provided with a gas-permeable protective member to preclude entry of splashes from the suction port due to defecation, urination or flushing.

The power source for driving the fan may be a direct current source or an alternating current source. As the DC power supply, any of dry batteries, rechargeable storage batteries, solar batteries, etc. can be employed. Particularly for use in a closed system space, especially in a small and closed space where a power supply is not available, for example within a refrigerator, shoe box, closet, toilet, car, cupboard or the like, the use of batteries is preferred.

Regarding the apparatus for deodorizing a small and closed space where a power supply is not available, it comprises a battery (preferably dry battery) as a power source for driving a fan means, in addition to an activated carbon adsorbent (preferably an activated carbon honeycomb) and a fan means disposed in a gas passageway extending from a gas inlet to a gas outlet as similar to the above embodiment. Moreover, the preferred apparatus is provided with a gas inlet and outlet being formed in such a manner that the direction of suction is not parallel to the direction of discharge.

Figure 3:
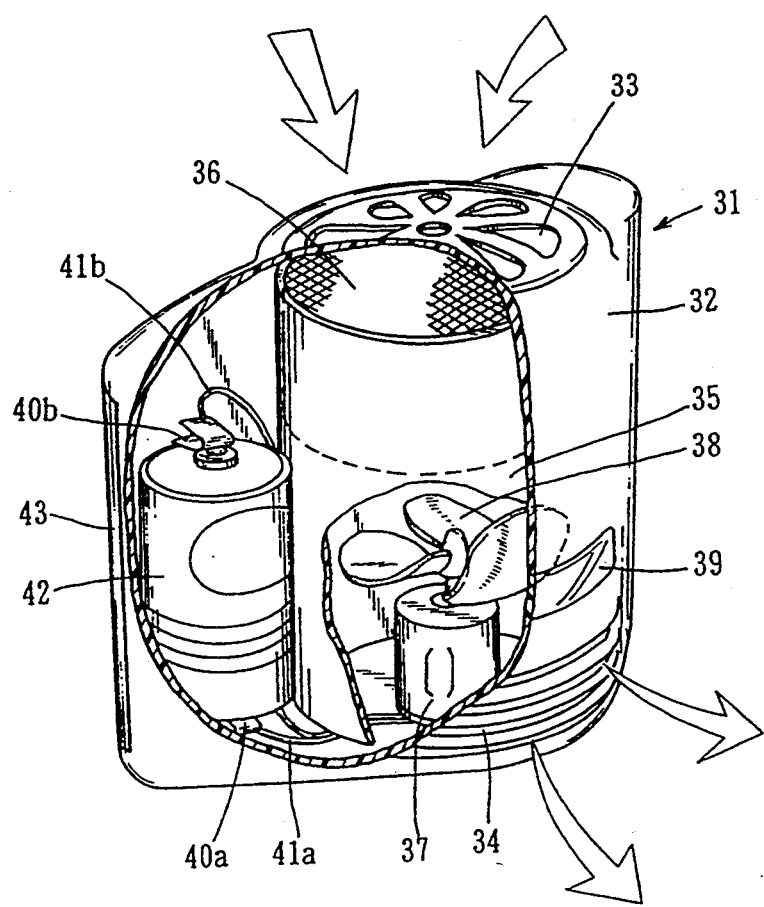
FIG. 3 is a partially exploded schematic perspective view showing another gas treating apparatus provided with an activated carbon of the invention.

FIG. 3 is a partially exploded schematic perspective view showing another gas treating apparatus in which the activated carbon adsorbent of the invention is used. This embodiment is an apparatus suitable for the deodorization of a small space in which a power supply is not available, for example within a refrigerator and so on.

The apparatus 31 according to this embodiment comprises a gas inlet means 33 at the top of its casing 32 and a gas outlet means 34 in the lateral wall of a lower part thereof. The top end face of the casing 32 which corresponds to the gas inlet means 33 is somewhat bulged out, while its lateral walls corresponding to the gas outlet means 34 are curved outwardly. Disposed within the casing 32 is a cylinder 35 forming a gas passageway extending from the gas inlet means 33 to the gas outlet means 34. The lower lateral side of the cylinder 35 is formed with an opening (not shown) communicating with the gas outlet means 34.

An activated carbon honeycomb 36 supporting an alkali metal iodide and phosphoric acid is disposed in an upper portion of the cylinder 35. A fan 38 which is driven by a small motor 37 is disposed in a lower portion of the cylinder 35. With the rotation of the fan 38, the gas to be treated is drawn from the gas inlet means 33 into the gas passageway and deodorized by the activated carbon honeycomb 36, with the treated gas being discharged from the gas outlet means 34. The side wall of the casing 32 is formed with a sight hole or window 39 through which the rotational status of the fan 38 can be ascertained.

Further disposed within the casing 32 is a pair of conductive metal plates 40a, 40b, which are supported by a supporting member (not shown), to be engaged by dry batteries 42. These conductive metal plates 40a, 40b are connected to the motor 37 via leads 41a, 41b. Each of the conductive metal plates 40a and 40b is bent into resilient contact with the positive and negative electrodes of the dry batteries 42.

The lateral side of the casing 32 is provided with a dismountable cover 43. This cover 43 is utilized for change of the batteries 42 and withdrawal of the cylinder 35 housing the activated carbon honeycomb 36. Since the opening formed in the lower lateral wall of the cylinder is larger than the motor 37 and fan 38, withdrawal of the cylinder 35 from the casing 32 or installation thereof into the casing 32 is not impeded.

In this deodorizing apparatus 31, the gas inlet means 33 and gas outlet means 34 of casing 32 which are disposed in different orientations are not obstructed by extraneous articles in the space such as a refrigerator and so on. Further, since the fan 38 is rotated by the batteries 42 and the motor 37, the gas to be treated is brought by force from the gas inlet means 33 to the gas outlet means 34 within said space. Therefore, malodorous and harmful gaseous components can be smoothly and effectively removed from a closed space where no power supply is available, for example within a refrigerator, shoe box or the like. Furthermore, by checking for the rotational status of the fan 38 through the window 39, the life and time of replacement of the batteries 42 can be accurately ascertained. In addition, replacement of the batteries 42 and the cylinder 35 can be easily carried out by way of the cover 43.

When the apparatus shown in FIG. 3 is utilized for deodorization, it is not necessary to stand the casing on a floor of the space, but, for instance, a cylindrical casing may lie on the floor of the space. Where the casing is in the form of a cylindrical shape, the apparatus may comprises a gas inlet means and a gas outlet means formed in differently oriented parts of the casing, a gas passageway extending from the gas inlet means to the gas outlet means, an activated carbon honeycomb adsorbent, a fan means and a motor, and at least one battery which is disposed in the gas passageway in an appropriate order, preferably in the order listed.

The casing need only be such that the activated carbon honeycomb(s) or cylinder and the battery(ies) can be mounted therein and, for example, that the regions of the casing which correspond to the installation positions of the activated carbon honeycomb(s) or cylinder and the battery(ies) can be opened and closed by a cover means hinged to the casing body.

The gas outlet means may be formed in any appropriate position of the casing downstream of the fan, as a fan means, and the motor, as a driving means, but the gas outlet means is preferably formed in the peripheral wall of the casing which lies downstream of the fan. The gas passageway may be provided with a guide member for guiding the gas to the gas outlet means in a position downstream of the fan. In this case, the gas treated by the activated carbon honeycomb can be smoothly discharged from the gas outlet means.

The gas inlet and outlet means can be disposed in any position in the casing with different orientations and within the range not interfering with gas suction and discharge, for example on the front and top, respectively, or the front and one side, respectively, of the casing. Preferably the gas inlet and outlet means are disposed on the same or adjoining surfaces of the casing. Furthermore, the gas inlet and outlet means may be formed in any desired position that will not be obstructed by articles that may be present in the space to be treated but allowing the gas to flow through.

The apparatus may be provided with plural activated carbon adsorbents. As mentioned hereinbefore, the activated carbon adsorbent can be used in combination with the non-chemical-supporting activated carbon honeycomb(s) disposed on the upstream side of the adsorbent.

The sight hole or window formed in the casing can be located in any appropriate position where the rotational status of the fan can be ascertained. Moreover, in order that the rotational status of the fan may be more easily ascertained, the fan may be painted dissimilar shades for, e.g. fan blades, or for the face and reverse sides of the fan. Moreover, a dust filter or a static charge filter may be replaceably disposed at the gas inlet side of said casing.

Furthermore, in order to insure an efficient use of the battery in the apparatus, the casing may be provided, in an appropriate position, with a switch for turning the battery on and off. It is not necessary to use a plurality of batteries but only one battery is sufficient. The casing may also be provided with an alarm means for alerting the user to the exhaustion and time for replacement of the battery.

In the deodorizing apparatus illustrated in FIG. 3, which utilizes a battery as the energy source for the fan motor, it is difficult to increase the flow rate in relation to the battery life. While the number of cells in the activated carbon honeycomb can be selected in relation to the source voltage, there is an optimum range for the number of cells in the activated carbon honeycomb in a deodorizing apparatus with a low flow rate. By way of illustration, when the flow rate is as low as about 80 to 700 liters/hr, the desirable cell density in the activated carbon honeycomb may for example be about 10 to 500 cells/inch$^2$, preferably about 20 to 200 cells/inch$^2$, more preferably about 22 to 150 cells/inch$^2$, and specifically about 25 to 125 cells/inch$^2$. The preferred flow rate is in the range of from about 100 to 500 liters/hr, and particularly from 150 to 400 liters/hr.

When such an activated carbon honeycomb is used in an apparatus with a low flow rate, even if the number of cells is small and the area of contact with the gas is small, malodorous gaseous components can be almost completely and smoothly eliminated in a single pass without affecting a large load on the fan. Moreover, even if the malodorous gaseous components cannot be completely removed in a single pass, they can be eliminated in a short time period with high efficiency. Therefore, this deodorizing apparatus is useful for the deodorization of closed spaces, for example within a refrigerator, shoe box, closet, cupboard, chest of drawers, car or the like.

The activated carbon adsorbent of the present invention is also useful for a trash can-deodorizing apparatus. The trash can-deodorizing apparatus usually comprises a box for accommodating garbage and a lid member covering the opening of the box, and the box is communicated with a gas inlet means of a gas treatment unit (apparatus).

Figure 4:
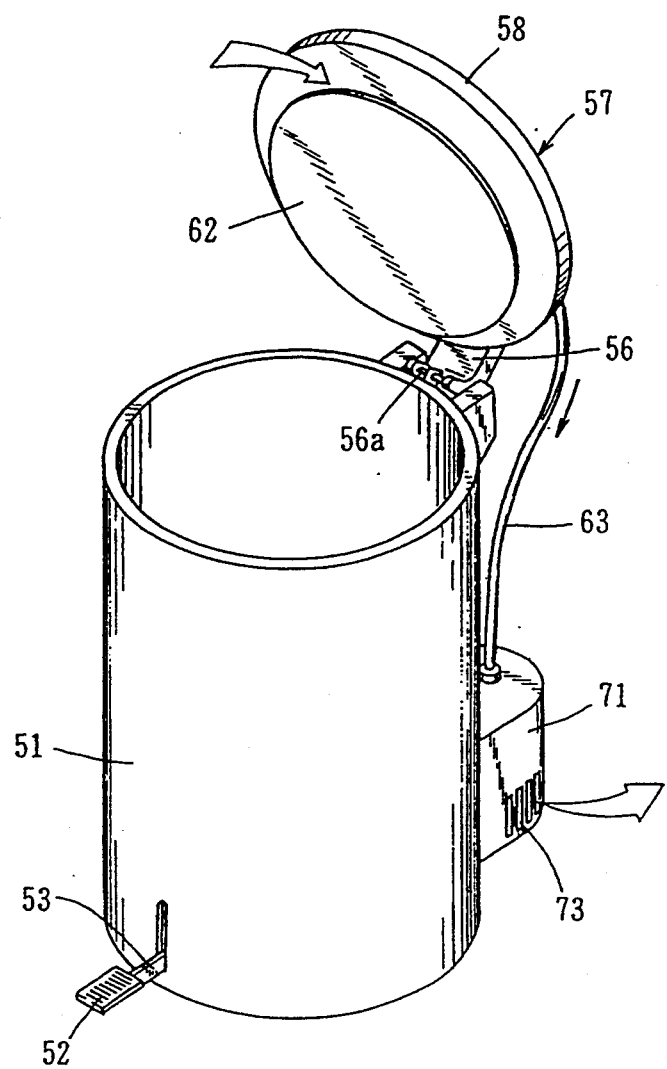
FIG. 4 is a schematic perspective view of a further gas treating apparatus in which the activated carbon of the invention is used.
Figure 5:
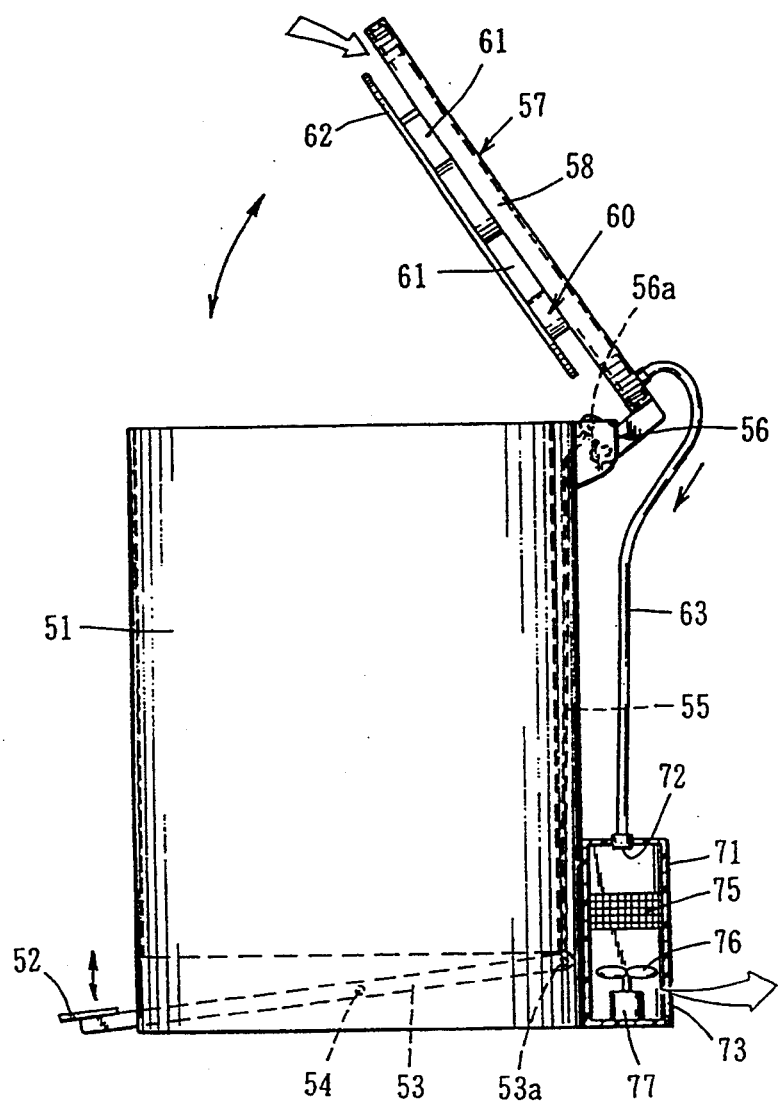
FIG. 5 is a schematic side view showing the apparatus shown in FIG. 4.
Figure 6:
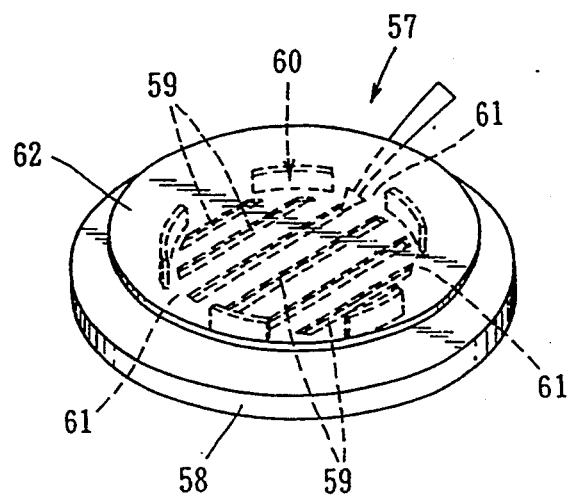
FIG. 6 is a schematic sectional perspective view showing a lid member of the apparatus shown in FIG. 4.

FIG. 4 is a schematic perspective view of a further gas treating apparatus provided with an activated carbon adsorbent of the invention, FIG. 5 is a schematic side view showing the apparatus shown in FIG. 4, and FIG. 6 is a schematic sectional perspective view showing a lid member of the apparatus shown in FIG. 4. In this embodiment, a trash can-deodorizing apparatus is illustrated.

This deodorizing apparatus comprises a box 51, which is cylindrical in cross-section and constitutes the body of a trash can, and a lid member 57 which is swingably connected to the box 51 by means of a hinge 56 and adapted to cover the open side of the box 51.

The box 51 is provided, in a lower position, with a pedal 52. Extending from this pedal 52 is a shaft 53 traversing a lower space of the box 51 and pivotally supported by a supporting member 54. Connected to a pivot 53a formed at the other end of the shaft 53 is one end of a connecting rod 55 extending along the side wall of the box 51, with the other end of the connecting rod 55 being secured to a pin 56a of the hinge 56. Thus, as the pedal 52 is depressed, the shaft 53 swings about the supporting member 54 to raise the connecting rod 55, whereby the lid member 57 is swung upwards about the hinge 56 to open the box 51.

The lid member 57 comprises a hollow lid body 58 adapted to cover the opening of the box 51, a plurality of slits 59 formed in the inner center of the lid body 58, and a shielding plate 62 attached to the lid body through a ring-shaped spacer means 60 arranged circumferentially on the inner surface of said lid body 58, the diameter of the shielding plate 62 being smaller than the diameter of the opening of the box 51. The ring-shaped spacer means 60 has a plurality of slits 61 communicating with the slits 59 of the lid body 58 at predetermined intervals.

The hollow part of the lid body 58 is communicably connected to a gas inlet means 72 of a casing 71 constituting a deodorizing unit by a flexible hose 63. Successively disposed within a gas passageway extending from the gas inlet means 72 to the gas outlet means 73 of the casing 71 are an activated carbon honeycomb 75 supporting an alkali metal iodide and phosphoric acid, a fan 76 and a motor 77 as in the apparatuses described hereinbefore. The motor 77 can be driven by a DC current, from a battery or the like, or an AC current.

Furthermore, a switch (not shown) adapted to detect contact between the box 51 and lid body 58 is disposed in a suitable peripheral position of the lid body 58 and a timer (not shown) for driving the motor 77 for a predetermined time is actuated in response to a detection signal from the switch.

In this deodorizing system, as the pedal 52 is depressed to displace the lid body 57 and open the box 51, garbage is put in the box 51 and the pedal 52 is released, the lid body 57 shuts off the opening of the box 51. In this connection, since the lid body 57 is provided with a shielding plate 62, the rubbish and dirty water are prevented from entering directly into the hollow cavity of the lid body 58. When garbage contained in a vinyl bag, paper bag or the like is discarded, the slits 59 of the lid body 58 are similarly protected against occlusion. The opening of the box 51 is not hermetically closed by the lid body 57 but there is generally some clearance between the box 51 and the lid body 58.

As the switch detects closure of the opening of the box 51 by the lid body 58, it produces a detection signal, and in response to this signal, the timer drives the motor 77 for a predetermined time. As the motor 77 is driven, the malodorous gas within the box 51 is drawn into the casing 71 of the deodorizing unit via the slits 61 of the ring-shaped spacer means 60, slits 59 of the lid member 58 and the hose 63 and is deodorized by the activated carbon honeycomb 75. The odor-free clean gas is discharged from the gas outlet means 73 of the casing 71.

In the above trash can-deodorizing apparatus, the hose is connected to one end of the lid body. However, the hose can be properly connected to a given position only if it may communicate with the hollow cavity of the lid body.

Figure 7:
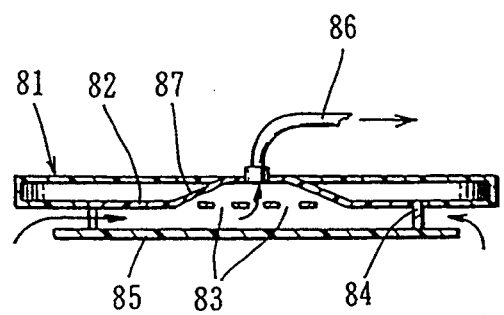
FIG. 7 is a schematic sectional view showing another lid member of a trash can-deodorizing apparatus having an activated carbon of the invention.

FIG. 7 is a schematic sectional view showing another lid member of a trash can-deodorizing apparatus. In this example, the hose 86 is connected to an approximate center of the lid body 82. Thus, the lid member 81 comprises a hollow lid body 82 having slits 83 formed internally, spacers 84 formed at predetermined intervals on the inner surface of the lid body, and a shielding plate 85 attached to the spacers.

Connected to an approximate center of the lid body 82 is a hose 86 communicating with the cavity of the hollow lid body 82. Disposed in the lid body 82 is a guide plate 87 for guiding the material gas in an inclined direction from the circumferential part of the slits 83 to the point of connection to said hose 86.

In the above trash can-deodorizing apparatus, the configuration of the box and of the lid member is not limited and may for example be square or the like. Moreover, the box itself may be used as the trash can or a case functioning as the trash can may be removably installed in the box. In the latter arrangement, since the case containing rubbish can be taken out from the box, it is not necessary to relocate the whole box for final disposal. Moreover, the mechanism for opening and closing the box with a pedal is not limited to the above-described structure but a variety of mechanical systems can be employed in a suitable combination. The spacers of the lid body and the shielding plate are not essential. Instead, narrow slits or holes for inhibiting the entry of splashes or the like may be formed in the lid body.

The gas treatment unit may be integrally attached to the box or incorporated in the box. When the gas treatment unit is attached to one side of the box, the unit and the hose may be covered with a cover means. Moreover, in the above gas treatment unit, a dust filter may be installed at the upstream side of the gas inlet means of the casing.

A small gas treatment unit may be interposed between the shielding plate and the lid body. In this case, the fan may be operated on a battery and the slits of the lid body are not necessary.

The means for opening and closing the lid member is not limited to the switch but a variety of sensors and switches, such as a piezoelectric sensor attached to the foot-pedal, the top surface of the box or the inner surface of the lid member or a contact sensor attached to one end of said connecting rod, for instance, can be utilized.

It may also be so arranged that the fan is driven continuously, without employing the sensor and switch.

The following examples, comparative examples and test examples are intended to describe the invention in further detail and should by no means be construed as limiting the scope of the invention.

EXAMPLES resulting activated carbon adsorbent had a moisture content of 25% by weight.

Test Example 1

The activated carbons of Comparative Examples 1 to 3 and the activated carbon adsorbent of Example 1 were respectively packed into polyvinyl chloride columns (4 cm $\phi$ in inside diameter) to a bed height of 30 cm.

Air (relative humidity 80%) containing 1.2 ppm of hydrogen sulfide, 0.6 ppm of methylmercaptan, 1.2 ppm of ammonia and 0.13 ppm of trimethylamine was passed through each column at a linear velocity of 30 cm/second, and the gas leaving the column outlet was tested for odor by the olfactory sense and at the same time analyzed for leak components by gas chromatography. The results are shown in Table 1. The results of the following Comparative Example 10, in which a mixed activated carbon adsorbent of an activated carbon supporting potassium iodide and an activated carbon supporting phosphoric acid was used, are also shown in Table 1.

TABLE 1

| | Chemical(s) supported | Amount supported (per gram of activated carbon) | Leak time | Leak component(s) | Odor by olfactory sense |
| --- | --- | --- | --- | --- | --- |
| Comp. Ex. 1 | Non-chemical Supporting | — | 2 days | Ammonia Trimethylamine | Significant odor |
| Comp. Ex. 2 | KI | 0.12 mg atom | 4 days | Ammonia Trimethylamine | Significant odor |
| Comp. Ex. 3 | Phosphoric acid | 4.59 mg equivalents | 7 days | Hydrogen sulfide Methylmercaptan | Significant odor |
| Ex. 1 | KI Phosphoric acid | 0.12 mg atom 4.59 mg equivalents | >150 days | None detected | No odor |
| Comp. Ex. 10 | KI Phosphoric acid | 0.12 mg atom 4.59 mg equivalents | 32 days | Methylmercaptan | Significant odor |

Comparative Example 1

Non-chemical-supporting granular activated carbon (4 to 6 mesh, BET specific surface area 1,150 m$^2$/g) was used.

Comparative Example 2

The same granular activated carbon as used in Comparative Example 1 was sprayed with an aqueous solution of potassium iodide to prepare an activated carbon adsorbent supporting 2% by weight of potassium iodide (0.120 mg atom as iodine/g of activated carbon). The activated carbon adsorbent thus obtained had a moisture content of 25% by weight.

Comparative Example 3

The same granular activated carbon as used in Comparative Example 1 was sprayed with an aqueous solution of phosphoric acid to prepare an activated carbon adsorbent supporting 15% by weight of phosphoric acid (4.59 mg equivalents of H$_3$PO$_4$/g of activated carbon). The thus-obtained activated carbon adsorbent had a moisture content of 25% by weight.

Example 1

The same granular activated carbon as used in Comparative Example 1 was sprayed with an aqueous solution of potassium iodide and phosphoric acid to prepare an activated carbon adsorbent supporting 2% by weight of potassium iodide (0.120 mg atom as iodine/g of activated carbon) and 15% by weight of phosphoric acid (4.59 mg equivalents/g of activated carbon). The thus- As apparent from Table 1, a large number of malodorous and harmful components can be removed over a long period of time when activated carbon adsorbent is supporting a specific amount of the alkali metal iodide and a specific amount of phosphoric acid.

Comparative Example 4

An activated carbon honeycomb having a BET specific surface area of 810 m$^2$/g, a cell number of 300 cells/inch$^2$, a diameter of 50 mm $\phi$ and a thickness of 25 mm was used and the test was performed as mentioned above. The results are shown in Table 2.

Comparative Example 5

The same activated carbon honeycomb as used in Comparative Example 4 was sprayed with an aqueous solution of potassium iodide and phosphoric acid to prepare a honeycomb supporting 1% by weight of potassium iodide (0.060 mg atom as iodine/g of activated carbon) and 4% by weight of phosphoric acid (1.223 mg equivalents of H$_3$PO$_4$/g of activated carbon), and then dried at 110° C. to give an activated carbon honeycomb adsorbent.

Example 2

The same activated carbon honeycomb as used in Comparative Example 4 was sprayed with an aqueous solution of potassium iodide and phosphoric acid to prepare a honeycomb supporting 1% by weight of potassium iodide (0.060 mg atom as iodine/g of activated carbon) and 10% by weight of phosphoric acid (3.058 mg equivalents of H₃PO₄/g of activated carbon), and then dried at 110° C. to give an activated carbon honeycomb adsorbent.

Example 3

The same activated carbon honeycomb as used in Comparative Example 4 was sprayed with an aqueous solution of potassium iodide and phosphoric acid to obtain a honeycomb supporting 2% by weight of potassium iodide (0.120 mg atom as iodine/g of activated carbon) and 15% by weight of phosphoric acid (4.587 mg equivalents of H₃PO₄/g of activated carbon), followed by drying at 110° C. to give an activated carbon honeycomb adsorbent.

Comparative Example 6

The same activated carbon honeycomb as used in Comparative Example 4 was sprayed with an aqueous solution of potassium iodide and phosphoric acid to prepare a honeycomb supporting 3% by weight of potassium iodide (0.181 mg atom as iodine/g of activated carbon) and 25% by weight of phosphoric acid (7.645 mg equivalents of H₃PO₄/g of activated carbon), and then dried at 110° C. to give an activated carbon honeycomb adsorbent.

Test Example 2

The activated carbon honeycombs obtained in Comparative Examples 4 to 6 and Examples 2 and 3 were respectively inserted into polyvinyl chloride columns having an inside diameter of 50 mm φ.

Air (relative humidity 80%) containing 100 ppb of hydrogen sulfide, 85 ppb of methylmercaptan and 180 ppb of monomethylamine was passed through each column at a linear velocity of 50 cm/second, and the gas leaving the column outlet was tested for odor by the olfactory sense and at the same time analyzed for leak components by gas chromatography. The results are shown in Table 2.

Example 4

An activated carbon honeycomb having a BET specific surface area of 810 m²/g, a cell number of 100 cells/inch², a size of 50 mm φ and a thickness of 20 mm was sprayed with an aqueous solution of potassium iodide and phosphoric acid to prepare a honeycomb supporting 1% by weight of potassium iodide (0.060 mg atom as iodine/g of activated carbon) and 10% by weight of phosphoric acid (3.058 mg equivalents/g of activated carbon), and then dried at 110° C. to give an activated carbon honeycomb adsorbent.

Example 5

The activated carbon honeycomb adsorbent obtained in Example 4 was mounted on an apparatus provided with a dry cell (1.5 V), a motor and a fan, as shown in FIG. 3, to give a gas treatment apparatus for deodorization.

Test Example 3

The apparatus prepared in Example 5 was placed in a commercial refrigerator (capacity 112 liters). A gas containing 3 ppm of hydrogen sulfide (H₂S) and 3 ppm of methylmercaptan (M.M) was injected into the refrigerator. The residual concentration of each malodorous component in the gas in the refrigerator was determined at timed intervals by gas chromatography. The results are shown in Table 3 and Table 4. The gas flow rate and linear velocity employed in this test are also shown in Table 3.

Similarly, a gas containing 60 ppm of ammonia (NH₃) was introduced into the refrigerator and the residual ammonia concentration in the refrigerator was determined at timed intervals in the same manner as mentioned above. The results thus obtained are shown in Table 4.

For comparison, the residual concentration of each malodorous component as resulting from spontaneous attenuation was determined (Comparative Example 7) and the residual concentration of each malodorous component as attained by using a commercial refrigerator deodorizer (Kimco ™, American Drug Corporation) containing granular activated carbon was determined (Comparative Example 8) in the same manner as mentioned above. The results are also shown in Table 3 and Table 4.

TABLE 2

|  | Chemical(s) supported | Amount supported (per gram of activated carbon) | Leak time | Leak component(s) | Odor by olfactory sense |
| --- | --- | --- | --- | --- | --- |
| Comp. Ex. 4 | Non-chemical Supporting | — | 1 hour | Hydrogen sulfide Methylmercaptan Monomethylamine | Significant odor |
| Comp. Ex. 5 | KI Phosphoric acid | 0.060 mg atom 1.223 mg equivalents | 20 hours | Monomethylamine | Significant odor |
| Ex. 2 | KI Phosphoric acid | 0.060 mg atom 3.058 mg equivalents | >200 hours | None detected | No odor |
| Ex. 3 | KI Phosphoric acid | 0.120 mg atom 4.587 mg equivalents | >200 hours | None detected | No odor |
| Comp. Ex. 6 | KI Phosphoric acid | 0.180 mg atom 7.645 mg equivalents | 1 hour | Hydrogen sulfide Methylmercaptan | Significant odor |

As shown in Table 2, the use of the activated carbon honeycomb adsorbents supporting the alkali metal iodide and phosphoric acid in the specific proportions significantly remove a plurality of malodorous and harmful components over a long period time.

TABLE 3

| | Malodorous component | Removal by one pass (%) | Residue after 5 minutes (%) | Gas flow rate (liters/hour) | Linear velocity (cm/second) |
|---|---|---|---|---|---|
| Ex. 5 | $H_2S$ | 100 | 30 | 559 | 7.9 |
| | M.M | 100 | 30 | | |
| Comp. Ex. 7 | $H_2S$ | — | 80 | — | — |
| | M.M | — | 83 | | |
| Comp. Ex. 8 | $H_2S$ | — | 80 | — | — |
| | M.M | — | 83 | | |

TABLE 4

[Residue of malodorous components, %]

| Malodorous component | | Time (minutes) | | | | | | | |
|---|---|---|---|---|---|---|---|---|---|
| | | 0 | 5 | 10 | 20 | 30 | 40 | 50 | 60 |
| $H_2S$ | Example 5 | 100 | 30 | 12 | 2 | 1 | 0 | — | — |
| | Comparative Example 7 | 100 | 80 | 68 | 60 | 52 | 48 | 48 | 48 |
| | Comparative Example 8 | 100 | 82 | 70 | 56 | 48 | 44 | 37 | 37 |
| M.M | Example 5 | 100 | 30 | 10 | 2 | 1 | 0 | — | — |
| | Comparative Example 7 | 100 | 83 | 67 | 61 | 56 | 50 | 50 | 50 |
| | Comparative Example 8 | 100 | 83 | 67 | 56 | 50 | 44 | 39 | 33 |
| $NH_3$ | Example 5 | 100 | 33 | 12 | 4 | 1 | 0 | — | — |
| | Comparative Example 7 | 100 | 83 | 56 | 47 | 40 | 37 | 33 | 30 |
| | Comparative Example 8 | 100 | 68 | 50 | 45 | 37 | 33 | 30 | 27 |

It is evident from Table 3 and Table 4 that when an activated carbon honeycomb supporting a specific amount of the alkali metal iodide and a specific amount of phosphoric acid is used, malodorous components can be removed efficiently in a short period of time even if the cell number is small.

Example 6

The same activated carbon honeycomb as used in Comparative Example 4 was uniformly sprayed with a mixed aqueous solution of potassium iodide (KI) and phosphoric acid to prepare a honeycomb simultaneously supporting 4.98% by weight of KI (0.3 mg atom as iodine/g of activated carbon) and 16.35% by weight of phosphoric acid (acid equivalent value: 5.0 mg equivalent/g of activated carbon), followed by drying at 110° C.

No irritating odor emanated at all during the drying procedure. The ignition point of the activated carbon honeycomb obtained was determined by the Japanese Industrial Standard (JIS) method. No ignition was noted even at 700° C., hence the ignition point was found to be above 700° C.

Comparative Example 9

The same activated carbon honeycomb as used in Comparative Example 4 was uniformly sprayed with a mixed aqueous solution of an oxo acid of iodine ($HIO_3$) and sulfuric acid to obtain a honeycomb simultaneously supporting 5.28% by weight of $HIO_3$ (0.3 mg atom as iodine/g of activated carbon) and 24.5% by weight of sulfuric acid (acid equivalent value: 5.0 mg equivalents/g of activated carbon), followed by drying.

The drying procedure was accompanied by emanation of a significant irritating odor. The ignition point of the activated carbon honeycomb obtained as determined by the JIS method was 365° C.

Test Example 4

The activated carbon honeycombs obtained in Example 6 and Comparative Example 9 were respectively inserted into polyvinyl chloride columns having an inside diameter of 50 mm $\phi$. A gas (relative humidity: 80%) containing 300 ppb of hydrogen sulfide ($H_2S$), 300 ppb of methylmercaptan (M.M) and 300 ppb of trimethylamine was passed through each column at a linear velocity of 50 cm/second.

The gas leaving the column outlet was examined for odor by the olfactory sense and at the same time analyzed for leak components by gas chromatography. The results are shown in Table 5.

TABLE 5

| Activated carbon honeycomb | Chemical(s) supported | Amount supported (per gram of activated carbon) | Leak time | Leak component(s) | Odor by olfactory sense |
|---|---|---|---|---|---|
| Example 6 | KI | 0.3 mg iodine atom | >200 hours | None detected | No odor |
| | Phosphoric acid | 5.0 mg equivalents | | | |
| Comparative Example 9 | $HIO_3$ | 0.3 mg iodine atom | 25 hours | Hydrogen sulfide | Significant odor |
| | $H_2SO_4$ | 0.5 mg equivalents | | Methylmercaptan | |

In the above test, hydrogen iodide (HI) was detected from the system where the activated carbon honeycomb of Comparative Example 9 was used. This is due the fact that the $HIO_3$ supported was released in the form of HI. On the contrary, any substance suggesting the release of iodine was not detected at all from the system where the activated carbon honeycomb of Example 6 was used.

Comparative Example 10

The same granular activated carbon as used in Comparative Example 1 was sprayed with an aqueous solution of potassium iodide to prepare an activated carbon adsorbent A supporting 4% by weight of potassium iodide (0.240 mg atom as iodine/g of activated carbon). The activated carbon adsorbent A thus obtained had a moisture content of 25% by weight.

On the other hand, the same granular activated carbon as used in Comparative Example 1 was sprayed with an aqueous solution of phosphoric acid to prepare an activated carbon adsorbent B supporting 30% by weight of phosphoric acid (9.174 mg equivalents of $H_3PO_4$/g of activated carbon). The thus-obtained activated carbon adsorbent B had a moisture content of 25% by weight.

The activated carbon adsorbent A and B were mixed in the same volumetric amounts to obtain a mixed activated carbon adsorbent C apparently supporting 2% by weight of potassium iodide (0.120 mg atom as iodine/g of activated carbon) and 15% by weight of phosphoric acid (4.587 mg equivalents of $H_3PO_4$/g of activated carbon). The activated carbon adsorbent C was packed into polyvinyl chloride columns (4 cm $\phi$ in inside diameter) to a bed height of 30 cm, and the deodorization test was conducted in the same manner as in Test Example 1. As a result, on 32 days, leakage of methylmercaptan from the column outlet was detected and a significant odor was olfactoryly sensed.

Example 7

The same activated carbon honeycomb as used in Comparative Example 4 was uniformly sprayed with a mixed aqueous solution of sodium iodide (NaI) and phosphoric acid to prepare a honeycomb simultaneously supporting 2.70% by weight of NaI (0.180 mg atom as iodine/g of activated carbon) and 10.0% of phosphoric acid (3.058 mg equivalents of $H_3PO_4$/g of activated carbon), followed by drying at 110° C.

The resulting activated carbon honeycomb was subjected to the same deodorization test as in Test Example 2, even after 200 hours from starting the test, leakage of malodorous components from the column outlet was not detected and no odor was sensed.

Examples 8 to 16 and Comparative Examples 11 to 14

An activated carbon honeycomb with a BET specific surface area of 920 m$^2$/g, a cell number of 350 cells/inch$^2$, a size of 30 mm $\phi$ and a thickness of 40 mm was sprayed with an aqueous solution of potassium iodide and phosphoric acid and dried at 110° C. to prepare an activated carbon honeycombs supporting a specific amount of potassium iodide and phosphoric acid which are shown in Tables 6-1 and 6-2.

Test Example 5

The activated carbon honeycombs obtained in Examples 8 to 16 and Comparative Examples 11 to 14 were respectively inserted into polyvinyl chloride columns having an inside diameter of 30 mm$\phi$. A gas (relative humidity: 80%) containing 300 ppb of hydrogen sulfide ($H_2S$), 300 ppb of methylmercaptan (M.M) and 300 ppb of trimethylamine (($CH_3$)$_3$N) was passed through each column at a linear velocity of 25 cm/second.

The gas leaving the column outlet was examined for odor by the olfactory sense and analyzed for leak components by gas chromatography. The results are shown in Tables 6-1 and 6-2.

TABLE 6-1

| | Chemicals supported | Amount supported (per gram of activated carbon) | Leak time | Leak component(s) | Odor by olfactory sense |
| --- | --- | --- | --- | --- | --- |
| Comp. Ex. 11 | KI Phosphoric acid | 0.301 mg atom 1.223 mg equivalents | 24 hours | ($CH_3$)$_3$N | Significant odor |
| Ex. 8 | KI Phosphoric acid | 0.301 mg atom 1.406 mg equivalents | >100 hours | None detected | No odor |
| Ex. 9 | KI Phosphoric acid | 0.301 mg atom 3.058 mg equivalents | >100 hours | None detected | No odor |
| Ex. 10 | KI Phosphoric acid | 0.301 mg atom 4.587 mg equivalents | >100 hours | None detected | No odor |
| Ex. 11 | KI Phosphoric acid | 0.301 mg atom 6.880 mg equivalents | >100 hours | None detected | No odor |
| Comp. Ex. 12 | KI Phosphoric acid | 0.301 mg atom 8.256 mg equivalents | 7 hours | $H_2S$ M.M | Significant odor |

TABLE 6-2

| | Chemicals supported | Amount supported (per gram of activated carbon) | Leak time | Leak component(s) | Odor by olfactory sense |
| --- | --- | --- | --- | --- | --- |
| Comp. Ex. 13 | KI Phosphoric acid | 0.012 mg atom 4.587 mg equivalents | 3 hours | $H_2S$ M.M | Significant odor |
| Ex. 12 | KI Phosphoric acid | 0.030 mg atom 4.587 mg equivalents | >100 hours | None detected | No odor |
| Ex. 13 | KI Phosphoric acid | 0.060 mg atom 4.587 mg equivalents | >100 hours | None detected | No odor |
| Ex. 14 | KI Phosphoric acid | 0.904 mg atom 4.587 mg equivalents | >100 hours | None detected | No odor |
| Ex. 15 | KI Phosphoric acid | 1.205 mg atom 4.587 mg equivalents | >100 hours | None detected | No odor |
| Ex. 16 | KI Phosphoric | 1.445 mg atom 4.587 mg | >100 hours | None detected | No odor |

TABLE 6-2-continued

| | Chemicals supported | Amount supported (per gram of activated carbon) | Leak time | Leak component(s) | Odor by olfactory sense |
|---|---|---|---|---|---|
| Comp. Ex. 14 | acid KI Phosphoric acid | equivalents 1.626 mg atom 4.587 mg equivalents | 42 hours | M.M | Significant odor |

Example 17

An activated carbon honeycomb having a BET specific surface area of 780 m$^2$/g, a cell number of 150 cells/inch$^2$, a size of 50 mm $\phi$ and a thickness of 20 mm was sprayed with an aqueous solution of potassium iodide and phosphoric acid to prepare a honeycomb supporting 1% by weight of potassium iodide (0.060 mg atom as iodine/g of activated carbon) and 8% by weight of phosphoric acid (2.446 mg equivalents of H$_3$PO$_4$/g of activated carbon), and dried to give an activated carbon honeycomb adsorbent.

For constructing a gas treatment apparatus for deodorization, a non-chemical-supporting activated carbon honeycomb (BET specific surface area of 780 m$^2$/g, a cell number of 150 cells/inch$^2$, a size of 50 mm $\phi$ and a thickness of 20 mm), the obtained activated carbon honeycomb adsorbent, a dry cell (1.5 V), a motor and a fan are disposed, in that order, in a gas passageway of an apparatus shown in FIG. 3 in a direction from a gas inlet to a gas outlet.

The apparatus was placed in a commercial refrigerator (capacity 112 liters). A gas containing 3 ppm of hydrogen sulfide, 3 ppm of methylmercaptan, 2.5 ppm of trimethylamine, 8 ppm of styrene and 5 ppm of isovaleric acid was injected into the refrigerator, and the gas was brought into contact with the non-chemical-supporting activated carbon honeycomb and the activated carbon honeycomb adsorbent in that order at a linear velocity of 6.6 cm/second. The residual concentration of each malodorous component in the gas in the refrigerator was determined at timed intervals by gas chromatography. As a result, after 90 minuets, the concentration of each component reduced to a detection limit value (not more than 0.05 ppm), and, after 24 hours, odor was not sensed.

What is claimed is:

1. An activated carbon adsorbent, comprising activated carbon and, homogeneously supported thereon, both 0.015 to 1.5 mg atoms of atomic iodine, per gram of the activated carbon, of an alkali metal iodide, and 1.4 to 7.0 mg equivalents, per gram of the activated carbon, of phosphoric acid.

2. An activated carbon adsorbent according to claim 1, which is in the form of a honeycomb.

3. An activated carbon adsorbent according to claim 2, wherein the honeycomb has a cell number of 10 to 1500 cells/square inch.

4. An activated carbon adsorbent according to claim 2, wherein the honeycomb has an aperture ratio of 50 to 80%.

5. An activated carbon adsorbent according to claim 1, wherein an amount of 0.02 to 1.25 mg atoms of atomic iodine, of an alkali metal iodide and 2.5 to 6.5 mg equivalents of phosphoric acid are supported on each gram of the activated carbon in a honeycomb form with a BET specific surface area of 400 to 2,500 m$^2$/g a cell number of 20 to 1,000 cells/square inch, a thickness of the entire honeycomb of 7.5 to 200 mm and an aperture ratio of 55 to 75%.

6. A gas treating apparatus which comprises a gas passageway extending from a gas inlet to a gas outlet, an activated carbon adsorbent disposed in said passageway and homogeneously supporting both 0.015 to 1.5 mg atoms of atomic iodine, per gram of the activated carbon, of an alkali metal iodide, and 1.4 to 7.0 mg equivalents, per gram of the activated carbon, of phosphoric acid, and a fan for passing a gas to be treated through said passageway from the gas inlet to the gas outlet.

7. A gas treating apparatus according to claim 6, wherein the activated carbon adsorbent is in a honeycomb form.

8. A gas treating apparatus according to claim 6, wherein the activated carbon adsorbent is disposed on the gas inlet side and the fan on the gas outlet side.

9. A gas treating apparatus according to claim 6, for use in association with a toilet, which further comprises a sensor for detecting a user's sitting on a toilet seat and leaving the seat, a driving means for driving said fan in said gas passageway in response to a sitting detection signal from said sensor, and a controller for controlling the operating time of said driving means in response to a leaving detection signal from said sensor, said apparatus being mountable on the toilet bowl with the gas inlet within said bowl and the gas outlet outside said bowl and capable of deodorizing the gas within the toilet bowl during use and after use thereof by drawing the gas in the bowl into said gas passageway through said gas inlet and bringing the gas into contact with said activated carbon adsorbent.

10. A gas treating apparatus according to claim 6, wherein an activated carbon honeycomb adsorbent with a cell number of 10 to 500 cells/square inch, a fan having a ventilating capacity of 70 to 800 liters/hour, and a dry battery or batteries as a power source for driving said fan are disposed in said gas passageway defined by a casing extending from said gas inlet means to said gas outlet means disposed in differently oriented parts of said casing.

11. A gas treating apparatus according to claim 6, for use in association with a toilet, which further comprises a photo sensor for detecting a user's sitting on a toilet seat and leaving the seat, a driving means for driving said fan in said gas passageway in response to a sitting detection signal from said photo sensor, and a controller for controlling the operating time of said driving means in response to a leaving detection signal from said sensor, said apparatus being mountable on the toilet bowl with the gas inlet within said bowl and the gas outlet outside said bowl and capable of deodorizing the gas within the toilet bowl during use and after use thereof by drawing the gas in the bowl into said gas passageway through said gas inlet and bringing the gas into contact with said activated carbon adsorbent.

12. A gas treating method which comprises bringing a gas to be treated into contact with an activated carbon adsorbent homogeneously supporting both 0.015 to 1.5 mg atoms atomic of iodine, per gram of the activated carbon, of alkali metal iodide, and 1.4 to 7.0 mg equivalents, per gram of the activated carbon, of phosphoric acid.

13. A gas treating method according to claim 12, wherein the activated carbon adsorbent is in a honeycomb form.

14. A gas treating method according to claim 12, wherein the gas to be treated contains at least one malodorous component selected from the group consisting of sulfur-containing compounds, nitrogen-containing compounds, organic carboxylic acids, aldehydes and aromatic hydrocarbons.

15. A gas treating method according to claim 12, wherein the gas to be treated containing at least one malodorous component selected from the group consisting of sulfur-containing compounds, nitrogen-containing compounds, organic carboxylic acids, aldehydes and aromatic hydrocarbons is brought into contact with the activated carbon adsorbent supporting 0.02 to 1.25 mg atoms as iodine of an alkali metal iodide and 1.4 to 7.0 mg equivalents of phosphoric acid per gram of activated carbon.

16. An activated carbon adsorbent comprising activated carbon and, homogeneously supported thereon, both 0.015 to 1.5 mg atoms of atomic iodine, per gram of the activated carbon, of an alkali metal iodide, and 2.0 to 7.0 mg equivalents, per gram of the activated carbon, of phosphoric acid.

17. A gas treating apparatus which comprises a gas passageway extending from a gas inlet to a gas outlet, an activated carbon adsorbent disposed in said passageway and homogeneously supporting both 0.015 to 1.5 mg atoms of atomic iodine, per gram of the activated carbon, of an alkali metal iodide, and 2.0 to 7.0 mg equivalents, per gram of the activated carbon, of phosphoric acid, and a fan for passing a gas to be treated through said passageway from the gas inlet to the gas outlet.

18. A gas treating method which comprises bringing a gas to be treated into contact with an activated carbon adsorbent homogeneously supporting both 0.015 to 1.5 mg atoms of atomic iodine, per gram of the activated carbon, of alkali metal iodide, and 2.0 to 7.0 mg equivalents, per gram of the activated carbon, of phosphoric acid.

19. An activated carbon adsorbent comprising activated carbon and, homogeneously supported thereon, both 0.015 to 1.5 mg atoms of atomic iodine, per gram of the activated carbon, of an alkali metal iodide, and 2.5 to 6.5 mg equivalents, per gram of the activated carbon, of phosphoric acid.

20. A gas treating apparatus which comprises a gas passageway extending from a gas inlet to a gas outlet, an activated carbon adsorbent disposed in said passageway and homogeneously supporting both 0.015 to 1.5 mg atoms of atomic iodine, per gram of the activated carbon, of an alkali metal iodide, and 2.5 to 6.5 mg equivalents, per gram of the activated carbon, of phosphoric acid, and a fan for passing a gas to be treated through said passageway from the gas inlet to the gas outlet.

21. A gas treating method which comprises bringing a gas to be treated into contact with an activated carbon adsorbent homogeneously supporting both 0.015 to 1.5 mg atoms of atomic iodine, per gram of the activated carbon, of alkali metal iodide, and 2.5 to 6.5 mg equivalents, per gram of the activated carbon, of phosphoric acid.

22. An activated carbon adsorbent, comprising activated carbon and, supported thereon, both 0.015 to 1.5 mg atoms of atomic iodine, per gram of the activated carbon, of potassium iodide, and 1.4 to 7.0 mg equivalents, per gram of the activated carbon, of phosphoric acid.

23. An activated carbon adsorbent, comprising activated carbon and, supported thereon, both 0.015 to 1.5 mg atoms of atomic iodine, per gram of the activated carbon, of potassium iodide, and 2.0 to 7.0 mg equivalents, per gram of the activated carbon, of phosphoric acid.

* * * * *